(12) United States Patent
Santamarina et al.

(10) Patent No.: US 8,740,513 B2
(45) Date of Patent: Jun. 3, 2014

(54) DUST COLLECTOR FOR USE WITH DRILL BIT OR DRILL BIT DEPTH STOP

(75) Inventors: Aland Santamarina, Columbia, MD (US); Darren B. Moss, York, PA (US); Mark E. Brunson, Bel Air, MD (US); David B. Lee, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 742 days.

(21) Appl. No.: 12/914,222

(22) Filed: Oct. 28, 2010

(65) Prior Publication Data

US 2011/0081214 A1    Apr. 7, 2011

Related U.S. Application Data (63) Continuation-in-part of application No. 12/776,653, filed on May 10, 2010, now Pat. No. 8,662,801, which is a continuation-in-part of application No. 12/708,085, filed on Feb. 18, 2010.

(60) Provisional application No. 61/154,957, filed on Feb. 24, 2009.

(51) Int. Cl.
*B23B 47/34* (2006.01)

(52) U.S. Cl.
USPC ............................................ 408/67; 175/211

(58) Field of Classification Search
USPC ............... 408/67, 72 R, 110, 113, 114, 202; 175/209, 211; 144/242.1; 407/137; 173/198
See application file for complete search history.

(56) References Cited

U.S. PATENT DOCUMENTS

| | | | | |
|---|---|---|---|---|
| 881,856 A | * | 3/1908 | Hagstrom | 408/67 |
| 2,107,552 A | * | 2/1938 | Smith | 175/209 |
| 2,439,008 A | | 4/1948 | Kellem | |
| 2,792,199 A | * | 5/1957 | Becker et al. | 175/211 |
| 2,967,441 A | | 12/1959 | Miles | |
| 3,339,435 A | | 9/1967 | Heitz | |
| 3,454,059 A | | 7/1969 | Sindelar | |
| 3,536,149 A | * | 10/1970 | Laird | 175/209 |

(Continued)

FOREIGN PATENT DOCUMENTS

| | | |
|---|---|---|
| DE | 1893039 | 5/1964 |
| DE | 1898860 | 8/1964 |

(Continued)

OTHER PUBLICATIONS

Translation of DE1 659 490.

(Continued)

*Primary Examiner* — Eric A Gates
*Assistant Examiner* — Paul M Janeski
(74) *Attorney, Agent, or Firm* — Scott B. Markow (57) ABSTRACT

A dust collector is disclosed for use with a drill bit or a depth stop that is coupled to a drill bit. The dust collector includes a rear attachment portion configured to be axially fixed to a drill bit or to a drill bit depth stop that is axially fixed to a drill bit. An intermediate non-collapsible portion is attached to a front end of the rear attachment portion. The intermediate non-collapsible portion defines a dust-collecting pocket and is structured to inhibit collapse as the drill bit is inserted into a workpiece. A front collapsible portion is attached to a front end of the intermediate non-collapsible portion and at least partially collapses as the drill bit is inserted into a workpiece.

13 Claims, 9 Drawing Sheets

(56) References Cited

U.S. PATENT DOCUMENTS

| | | | |
|---|---|---|---|
| 3,583,821 A | 6/1971 | Shaub et al. | |
| 3,620,637 A | 11/1971 | Brown | |
| 3,682,177 A | 8/1972 | Ames et al. | |
| 3,776,647 A | 12/1973 | Hart | |
| 3,934,661 A * | 1/1976 | Sauerwein et al. | 175/211 |
| 4,019,827 A | 4/1977 | Christianson et al. | |
| 4,123,193 A | 10/1978 | Hill | |
| 4,168,177 A | 9/1979 | Indelicato et al. | |
| 4,710,075 A | 12/1987 | Davison | |
| 4,955,984 A * | 9/1990 | Cuevas | 408/67 |
| 5,034,041 A | 7/1991 | Austin | |
| 5,078,552 A | 1/1992 | Albel | |
| 5,160,230 A * | 11/1992 | Cuevas | 408/67 |
| 5,653,561 A * | 8/1997 | May | 408/67 |
| 5,765,654 A | 6/1998 | Burger | |
| 5,882,151 A | 3/1999 | Wirth, Jr. et al. | |
| 5,904,453 A | 5/1999 | Gavia | |
| 5,961,257 A | 10/1999 | Bettini et al. | |
| 5,989,257 A | 11/1999 | Tidwell | |
| 6,079,078 A | 6/2000 | Byington | |
| 6,162,226 A | 12/2000 | DeCarlo, Jr. | |
| 6,511,268 B1 | 1/2003 | Vasudeva | |
| 6,514,258 B1 | 2/2003 | Brown et al. | |
| 6,739,872 B1 | 5/2004 | Turri | |
| 6,851,898 B2 | 2/2005 | Ege et al. | |
| 6,854,937 B1 | 2/2005 | Weiss | |
| 7,210,881 B2 | 5/2007 | Greenberg | |
| 7,258,513 B2 | 8/2007 | Gertner | |
| 7,322,429 B2 | 1/2008 | Kim | |
| 7,337,684 B1 * | 3/2008 | Lewis | 73/864.41 |
| D588,893 S | 3/2009 | Radich | |
| 7,513,722 B2 | 4/2009 | Greenberg et al. | |
| 7,549,826 B2 * | 6/2009 | Videtto | 408/1 R |
| 7,901,164 B2 * | 3/2011 | Skradski et al. | 408/67 |
| 2006/0188840 A1 | 8/2006 | Verban, Jr. | |
| 2007/0065242 A1 * | 3/2007 | Skradski et al. | 408/67 |
| 2007/0206996 A1 | 9/2007 | Bharadwaj et al. | |
| 2009/0148248 A1 | 6/2009 | Nishikawa et al. | |
| 2013/0034396 A1 * | 2/2013 | Witthoeft | 408/67 |
| 2013/0094915 A1 * | 4/2013 | Chen | 408/67 |

FOREIGN PATENT DOCUMENTS

| | | |
|---|---|---|
| DE | 1985830 | 5/1968 |
| DE | 1659490 | 12/1969 |
| DE | 6942542 | 6/1970 |
| DE | 2002320 | 7/1971 |
| DE | 2031357 | 12/1971 |
| DE | 2160831 | 12/1971 |
| DE | 2240346 | 2/1974 |
| DE | 2317779 | 10/1974 |
| DE | 2322743 | 11/1974 |
| DE | 2333662.1 | 1/1975 |
| DE | 2356565 | 5/1975 |
| DE | 2404504 | 8/1975 |
| DE | 2434641 | 1/1976 |
| DE | 2606122 | 8/1977 |
| DE | 2621386.5 | 9/1977 |
| DE | 2912396 | 10/1980 |
| DE | 3110458 | 10/1982 |
| DE | 3126511 | 3/1983 |
| DE | 3140776 | 4/1983 |
| DE | 222222 | 5/1985 |
| DE | 3800482.8 | 7/1989 |
| DE | 8810373.0 | 8/1989 |
| DE | 278079 | 4/1990 |
| DE | 9006555 | 8/1990 |
| DE | 9205794 | 6/1992 |
| DE | 9106606.9 | 9/1992 |
| DE | 9306373 | 6/1993 |
| DE | 4327870 | 3/1994 |
| DE | 4342484 | 4/1995 |
| DE | 29601678 | 4/1996 |
| DE | 19725401 | 2/1999 |
| DE | 197253574 | 7/1999 |
| DE | 20003290 | 8/2000 |
| DE | 102007019704 | 11/2008 |
| EP | 0295225 | 12/1988 |
| EP | 1714735 | 10/2006 |
| EP | 1759654 | 3/2007 |
| EP | 1854583 | 11/2007 |
| EP | 1857221 | 11/2007 |
| JP | 2001054837 A * | 2/2001 |
| WO | 94/09934 | 5/1994 |
| WO | 2005/025792 | 3/2005 |
| WO | WO 2011054988 A2 * | 5/2011 |

OTHER PUBLICATIONS

Translation of DE 2 240 346.

Translation of JP 2001-54837.

* cited by examiner

DUST COLLECTOR FOR USE WITH DRILL BIT OR DRILL BIT DEPTH STOP

CROSS-REFERENCE TO RELATED APPLICATIONS

This application is a continuation-in-part of U.S. patent application Ser. No. 12/776,653, filed May 10, 2010, titled "Depth Gauge for Drill Bit," which is a continuation-in-part of U.S. patent application Ser. No. 12/708,085, filed Feb. 18, 2010, titled "Depth Gauge for Drill Bit," and claims priority, under 35 U.S.C. §119(e), to U.S. Provisional Application No. 61/154,957, filed Feb. 24, 2009, titled "Depth Gauge for Hammer Drill Bit" (collectively the "Priority Applications"). Each of the foregoing Priority Applications is incorporated herein by reference.

TECHNICAL FIELD

This application relates to a dust collector for use with a drill bit or depth stop for drill bit.

BACKGROUND

Drill bits, especially those used in masonry applications, can generate a substantial amount of dust. It is known to have a dust collector that shrouds a portion of the drill bit and/or a depth stop used in conjunction with the drill bit, adjacent to the workpiece, in order to collect the dust generated by the drill bit. It is also known to have a dust collector shroud that collapses as the drill bit is inserted into the workpiece. However, many of the known dust collecting shrouds do not work well because they either do not collapse at all as the drill bit is inserted into the workpiece, or collapse too quickly or completely to leave room to retain dust inside of dust collecting shroud.

SUMMARY

In an aspect, a dust collector is disclosed for use with a drill bit or a depth stop that is coupled to a drill bit. The dust collector includes a rear attachment portion configured to be axially fixed to a drill bit or to a drill bit depth stop that is axially fixed to a drill bit. An intermediate non-collapsible portion is attached to a front end of the rear attachment portion. The intermediate non-collapsible portion defines a dust-collecting pocket and is structured to inhibit collapse as the drill bit is inserted into a workpiece. A front collapsible portion is attached to a front end of the intermediate non-collapsible portion and at least partially collapses as the drill bit is inserted into a workpiece.

Implementations of this aspect may include one or more of the following features. The rear attachment portion may include a cylindrical wall and a radially inward flange configured to be coupled to the drill bit or to the depth stop. The front collapsible portion may include an elastomeric material. The intermediate non-collapsible portion may include an elastomeric material. The non-collapsible portion may define at least one stiffening rib to inhibit collapse of the non-collapsible portion. A front non-collapsible portion may be attached adjacent to a front end of the front collapsible portion and configured to engage the workpiece. The front non-collapsible portion may define an auxiliary dust-collecting pocket. The front non-collapsible portion may include a rigid material. The front non-collapsible portion may include the same material as the collapsible portion. The collapsing portion may include a plurality of walls wherein each wall is joined to an adjacent wall by a joint that enables collapse of the walls. The joint may be a bellows joint. The plurality of walls may include a first wall that tapers radially outwardly from a the non-collapsible portion, and a second wall that tapers radially inwardly from the first wall. The joint may be a telescoping joint. The plurality of walls may include a plurality of generally cylindrical walls of increasing diameter from a rear end of the collapsible portion to a front end of the collapsible portion. Each generally cylindrical wall may be joined to an adjacent generally cylindrical wall by a radially outwardly flared wall to form a telescoping joint. The collapsible portion may be configured to turn at least partially inside out when the collapsible portion collapses.

In another aspect, a dust collector for use with a drill bit or a drill bit depth stop includes a rear attachment portion that includes a cylindrical wall and a radially inward flange configured to be axially fixed to a drill bit or to a depth stop configured to be axially fixed to a drill bit. An intermediate non-collapsible portion is attached to a front end of the rear attachment portion. The intermediate non-collapsible portion defines a dust-collecting pocket, and has at least one stiffening rib inhibiting collapse of the intermediate non-collapsible portion as the drill bit is inserted into a workpiece. A front collapsible portion is attached to a front end of the intermediate non-collapsible portion and at least partially collapses as the drill bit is inserted into a workpiece, The front collapsible portion includes a telescoping joint defined by a plurality of generally cylindrical walls of increasing diameter from a rear end of the front collapsible portion to a front end of the front collapsible portion, with each generally cylindrical wall being joined to an adjacent generally cylindrical wall by a radially outwardly flared wall.

Implementations of this aspect may include one or more of the following features. A front non-collapsible portion may be attached adjacent to a front end of the front collapsible portion and configured to engage the workpiece. The front non-collapsible portion may define an auxiliary dust-collecting pocket. The front non-collapsible portion may include at least one generally cylindrical wall of greater diameter than the generally cylindrical wall of greatest diameter in the front collapsible portion.

Advantages may include one or more of the following. The dust collector collapses in a known, predictable manner, leaving a pocket for retaining dust. Other advantages and features will be apparent from the description, the drawings, and the claims.

DETAILED DESCRIPTION

Figure 1:
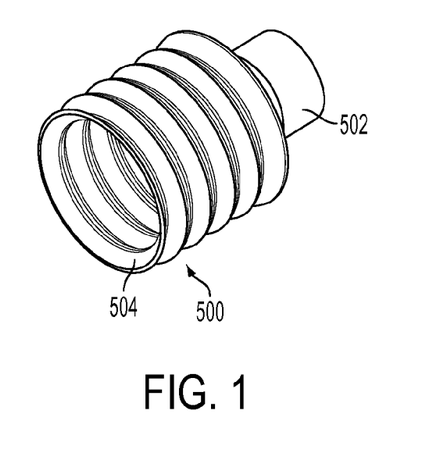
FIG. 1 is a perspective view of a first embodiment of a dust collector.
Figure 2:
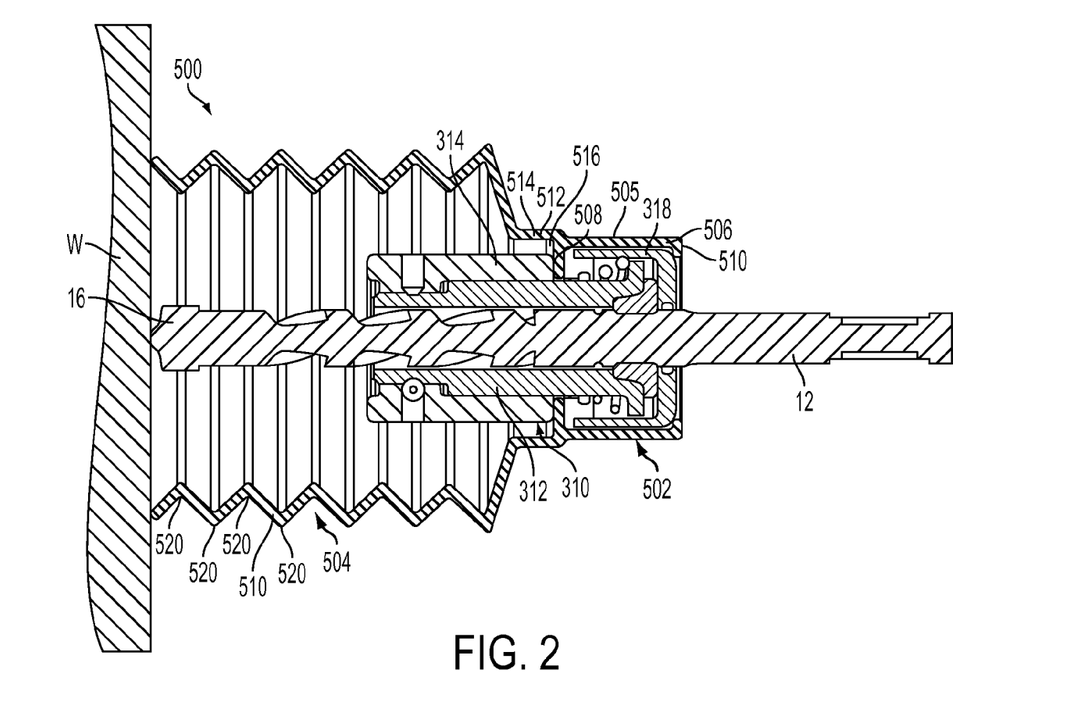
FIG. 2 is a cross-sectional view of the dust collector of FIG. 1, shown attached to a depth stop that is axially fixed to a drill bit.

FIGS. 1-2 of this application reproduce FIGS. 34-35 of the Priority Applications, and show one embodiment of a dust collector 500 that can be used with a masonry drill bit and/or with a drill bit and depth stop of the types described in the Priority Applications. In FIGS. 1-2, the dust collector 500 is shown in use in conjunction with the third embodiment of the depth stop 310 and drill bit 12 of the Priority Applications as a representative example. However, it should be understood that each of the dust collectors described in the present application can be used with this and other embodiments of the depth stops and drill bits shown in the Priority Applications, and with other designs of depth stops and drill bits.

The dust collector 500 includes a rear attachment portion 502 configured to be attached to a retention mechanism 318 of the depth stop 310, which retention mechanism 318 retains the depth stop 310 on the drill bit 12. The attachment portion 502 has a generally cylindrical sidewall 505, a radially inwardly projecting rear flange 506 that sits behind the retention mechanism 318, and a radially inwardly projecting front flange 508 that sits in front of the retention mechanism 22, to axially hold the dust collector 500 to the depth stop 310. It should be understood that the rear attachment portion 502 could be attached to other portions of the depth stop 310, or to other embodiments of depth stops, or to directly to the drill bit 12 or to other embodiments of drill bits, using similar or different attachment mechanisms.

The dust collector 500 further includes an intermediate non-collapsible portion 512 configured to collect dust. The intermediate non-collapsible portion 512 is attached to a front end of the rear attachment portion 502. The intermediate non-collapsible portion 512 includes a generally cylindrical side wall 514 that defines a pocket 516 configured to collect the dust. The intermediate non-collapsible portion 512 is of smaller diameter than the front collapsible portion 510 (described below) to inhibit collapse of the non-collapsible portion 512.

The dust collector 500 also includes a front collapsible section 504 attached to the front end of the non-collapsible portion 512. The collapsible section 504 includes a plurality of radially inwardly and outwardly projecting conical sidewalls 510 joined to each other by a plurality of bellows joints 520. The collapsible section 504 of the dust collector 500 surrounds a body 312 and a cap 314 of the depth stop 310, and a portion of the drill bit 12, including a tip 16 of the drill bit 12, such that the dust collecting portion 504 abuts against the workpiece W before the drill bit 12 penetrates the workpiece W. The collapsible side walls 510 collapse as the drill bit 12 is driven into the workpiece W while remaining abutted against the workpiece W, until the cap 314 of the depth stop 310 contacts the workpiece to inhibit further insertion of the drill bit 12 into the workpiece W.

In the embodiment shown in FIGS. 1 and 2, the rear attachment portion 502, the intermediate non-collapsible portion 512, and the front collapsible portion 504 are each made of a unitary piece of elastomeric material. In other embodiments, each of these elements can be separable, and one or more of these elements may be made of other materials, such as a rigid material (e.g., a hard plastic or metal).

Figure 3:
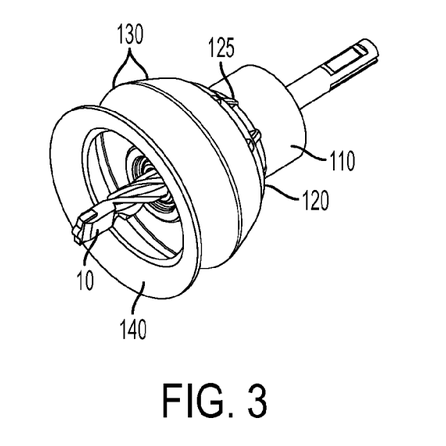
FIG. 3 is a perspective view of a second embodiment of a dust collector, shown attached to a depth stop that is axially fixed to a drill bit.
Figure 4:
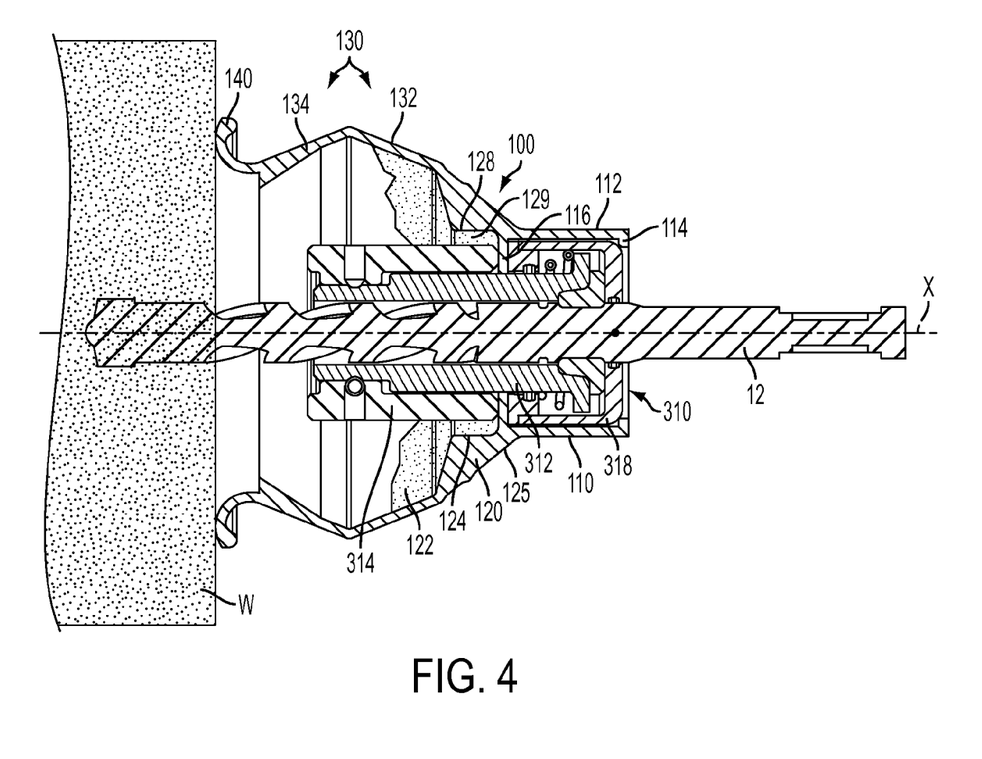
FIG. 4 is a cross-sectional view of the dust collector of FIG. 3. shown in an uncollapsed position.
Figure 5:
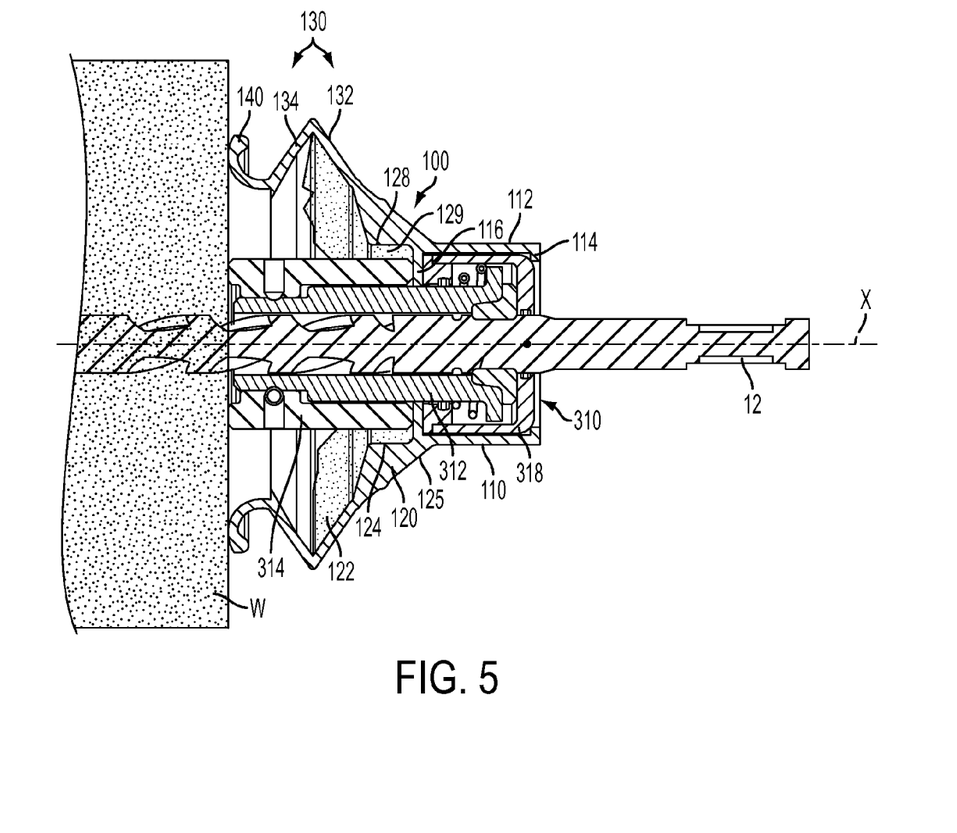
FIG. 5 is a cross-sectional view of the dust collector of FIG. 3. shown in a collapsed position.

Referring to FIGS. 3-5, in another embodiment, a dust collector 100 is configured to be used with a drill bit and/or a drill bit depth stop, such as one of the drill bits and/or depth stops described in the Priority Applications. For sake of example and illustration only, the dust collector 100 is shown in use with the depth stop 310 and drill bit 12 shown in the Priority Applications, but it should be understood that the dust collector can be used with other depth stops and/or drill bits.

Figure 6:
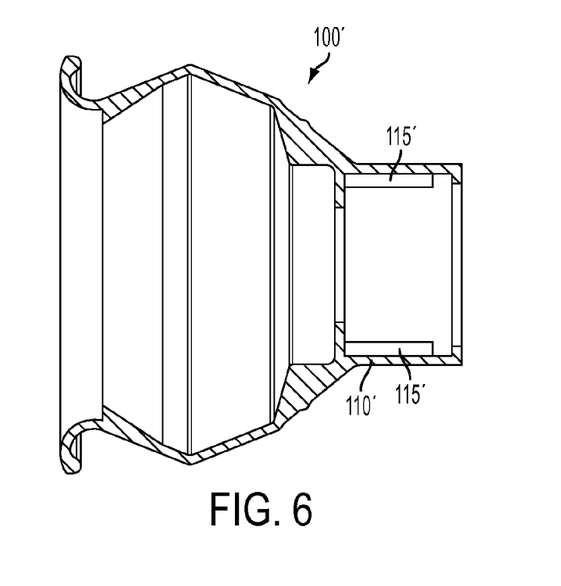
FIG. 6 is a cross-sectional view of a third embodiment of a dust collector.

The dust collector 100 includes a rear attachment portion 110 configured to be attached to a retention mechanism 318 of the depth stop 310, which retention mechanism 318 retains the depth stop 310 on the drill bit 12. However, it should be understood that the retention attachment portion 110 could be attached to another portion of the depth stop (e.g., the body 312 or the cap 314), or directly to the drill bit 12. The attachment portion 110 has a generally cylindrical sidewall 112, a radially inwardly projecting rear flange 114 that sits behind the retention mechanism 310, and a radially inwardly projecting front flange 116 that sits in front of the retention mechanism 310. In an alternative embodiment, as shown in FIG. 6, a dust collector 100' has a rear attachment portion 110' that includes a plurality of stiffening ribs 115' to lend structural support and inhibit collapse of the attachment portion 110'.

Referring again to FIGS. 3-5, the dust collector 100 further includes an intermediate non-collapsible portion 120 configured to collect dust 122. The intermediate non-collapsible portion 120 is attached to a front end of the rear attachment portion 110. The intermediate non-collapsible portion 120 includes a generally cylindrical side wall 124 with a generally cylindrical inner surface 128 that defines a pocket 129 configured to collect the dust. The intermediate non-collapsible portion 120 further includes a plurality of external reinforcing ribs 125 configured to inhibit collapse of the portion 120.

The dust collector 100 also includes a front collapsible section 130 attached to the front end of the non-collapsible portion 120. The collapsible section 130 is configured to collapse as the drill bit is inserted into the workpiece W until the cap 314 of the depth stop 310 engages the workpiece W. The collapsible section 130 includes a radially outwardly projecting generally conical sidewall 132 and a radially inwardly projecting generally conical sidewall 134. The sidewalls 132 and 132 are joined to each other by a joint 136, in this case a bellows-style joint with a single bellows.

The dust collector 100 additionally includes a front non-collapsible portion 140 attached to the front end of the front collapsible portion 130 and configured to engage the workpiece W. The front non-collapsible portion 140 flares outward from the front collapsible portion 130 and forms a seal between the workpiece W and the dust collector 100 to inhibit dust from escaping from the dust collector 100.

As shown in FIGS. 4 and 5, in use, as the drill bit 12 is inserted into the workpiece W, and the depth stop 310 approaches and ultimately abuts the workpiece W, the collapsible section 130 collapses due to movement of the joint 136 radially outwardly, with the angle of the walls 132 and 134 relative to the drill bit axis X increasing. At the same time, the ribs 125 and/or geometry of the non-collapsible portion 120 inhibit the non-collapsible portion 120 from collapsing, thus preserving the dust pocket 129.

Figure 7:
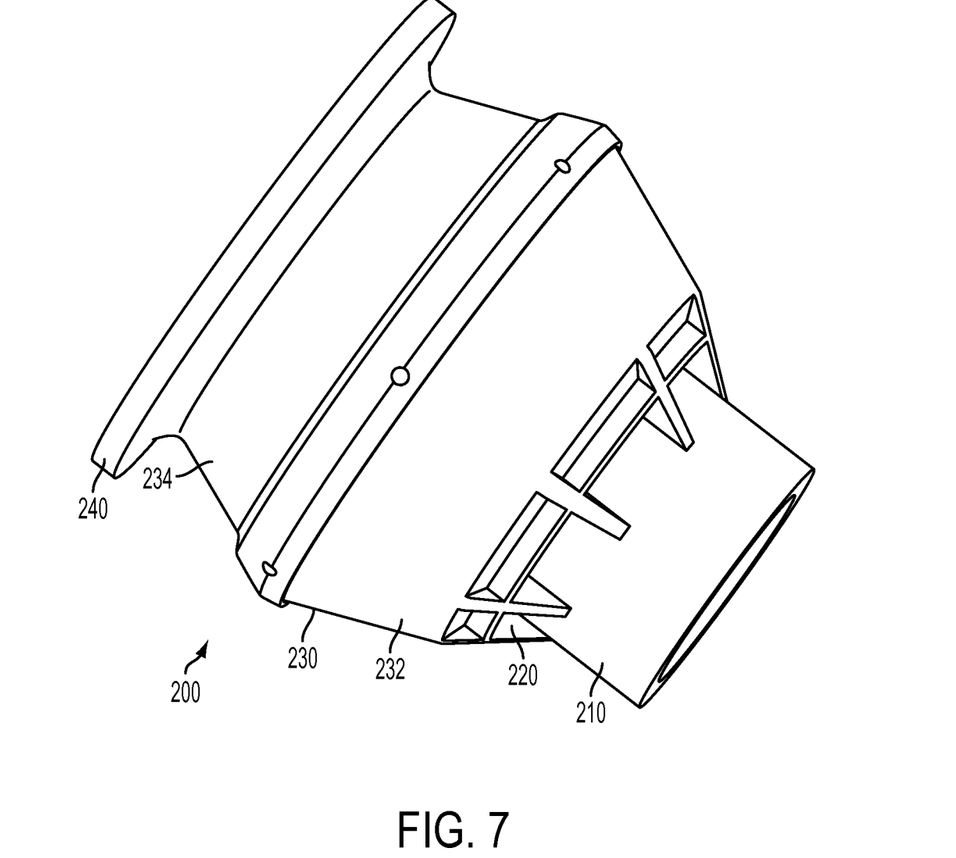
FIG. 7 is a perspective view of a fourth embodiment of a dust collector.
Figure 8:
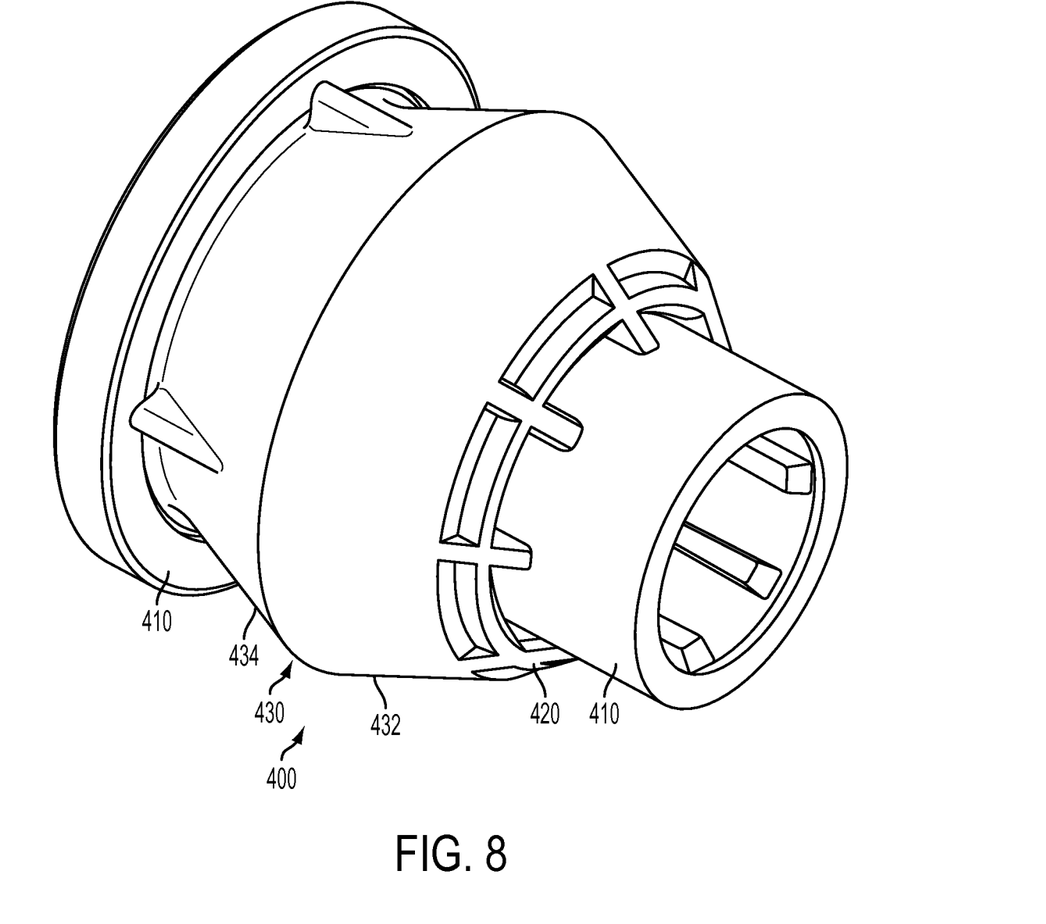
FIG. 8 is a perspective view of a fifth embodiment of a dust collector.

The dust collector 100 is made of a unitary piece of elastomeric material, such as rubber or soft plastic. However, it should be understood that some or all of the dust collector 100 can be made of a rigid material, such as a hard plastic or metal. For example, as shown in FIG. 7, in another embodiment, a dust collector 200 has substantially the same structure as dust collector 100, except that the rear attachment portion 210, the non-collapsible portion 220, and the collapsible portion 230 (which has only one wall 232) are made of an integral piece of elastomeric material, while the front non-collapsible portion 240 (which includes a wall 234) are made of a unitary piece of rigid material, such as a rigid plastic. In this embodiment, the wall 234 forms an auxiliary dust collecting pocket since it does not collapse. In another embodiment, as shown in FIG. 8, a dust collector 400 has substantially the same structure as dust collector 100, except that the rear attachment portion 410, the non-collapsible portion 420, and both walls 432, 434 of the collapsible portion 430 are made of an integral piece of elastomeric material, and the front non-collapsible portion 440 is made of a unitary piece of rigid material, such as a rigid plastic. In some other embodiments, the rigid material may be translucent or transparent to enable the user to visualize the drill bit.

Figure 9:
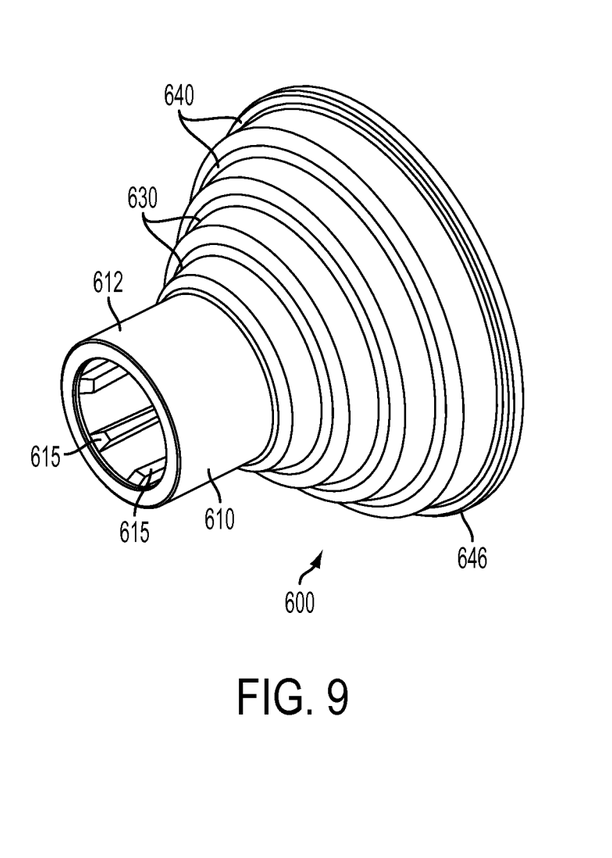
FIG. 9 is a perspective view of a sixth embodiment of a dust collector.
Figure 10:
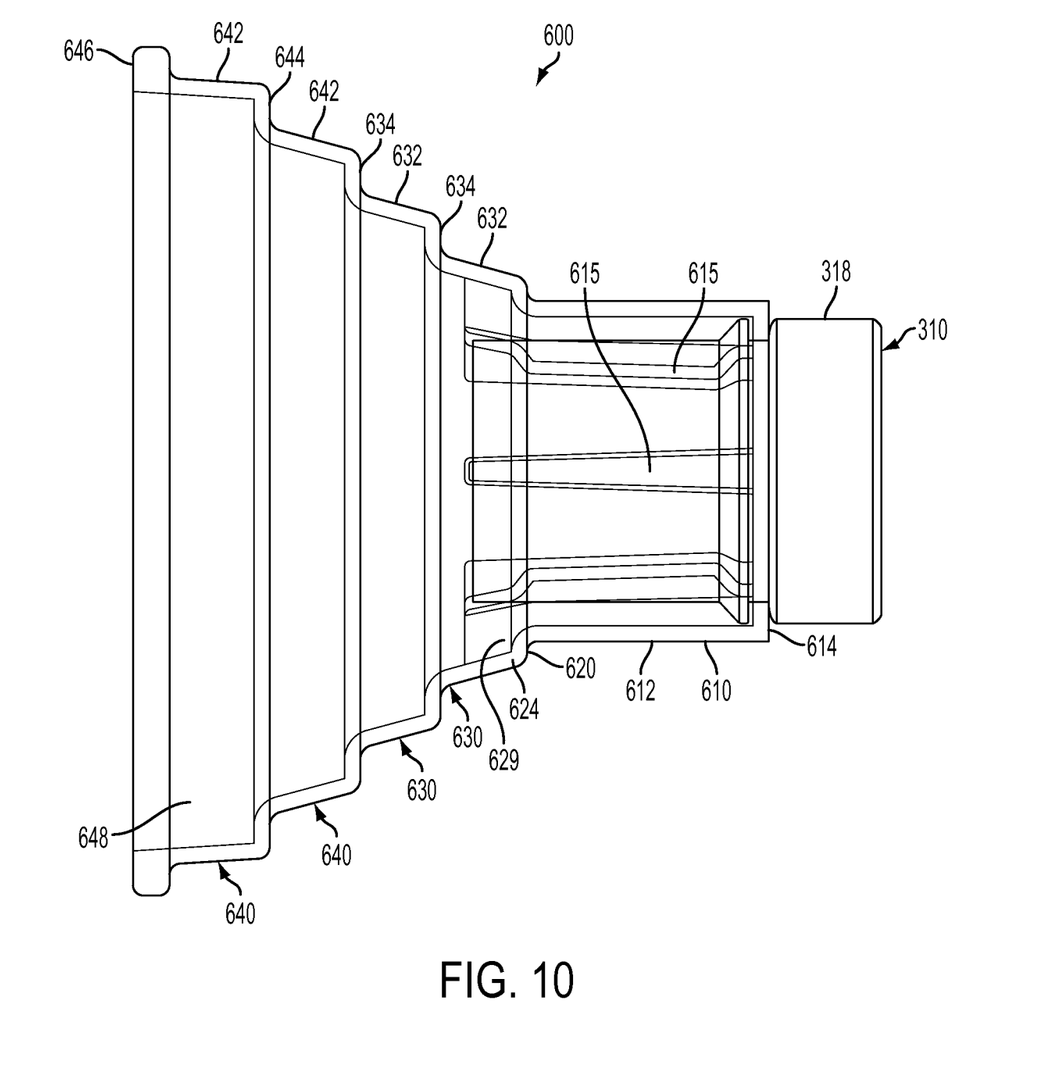
FIG. 10 is a cross-sectional view of the dust collector of FIG. 9, shown attached to a depth stop in an uncollapsed position.
Figure 11:
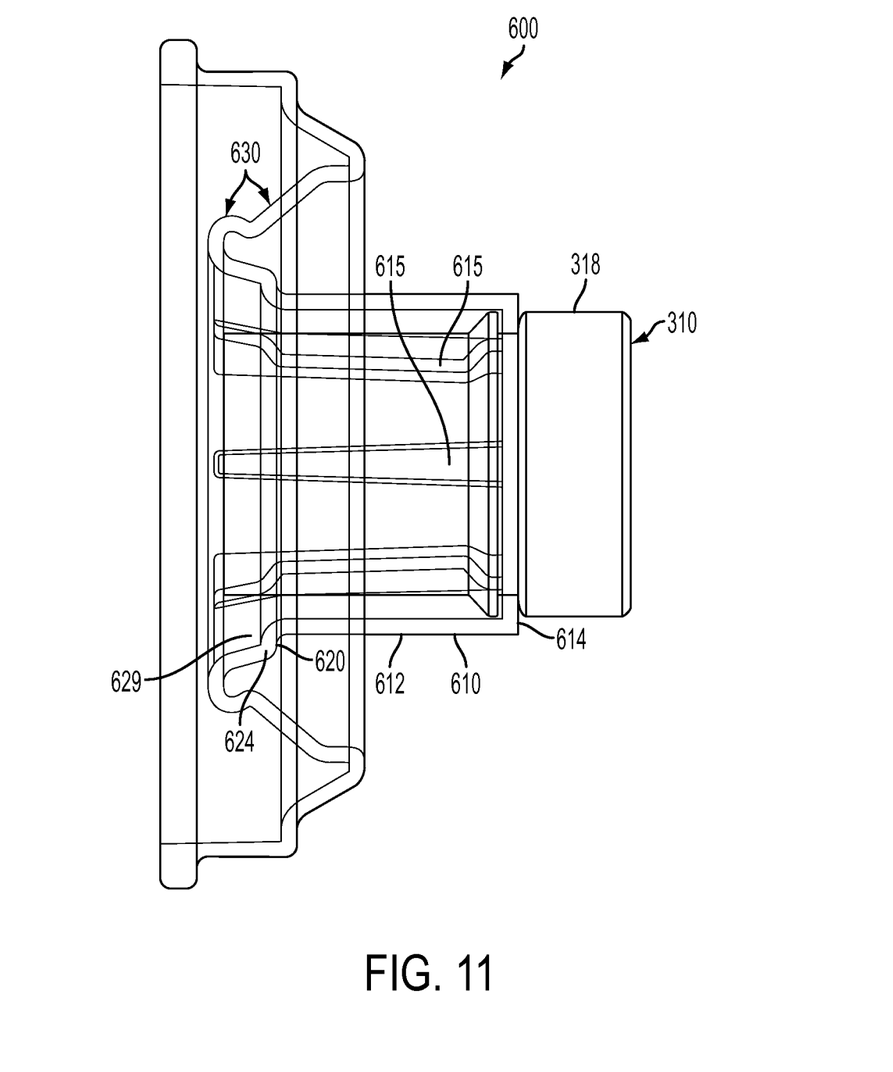
FIG. 11 is a cross-sectional view of the dust collector of FIG. 9, shown attached to a depth stop in a collapsed condition.

Referring to FIGS. 9-11, in another embodiment, a dust collector 600 is configured to be used with a drill bit and/or a drill bit depth stop, such as one of the drill bits and/or depth stops described in the Priority Applications. For sake of example and illustration only, the dust collector 600 is shown in use with the attachment portion 318 of the depth stop 310 shown in the Priority Applications, but it should be understood that the dust collector can be used with other depth stops and/or drill bits.

The dust collector 600 includes a rear attachment portion 610 configured to be attached to a retention mechanism 318 of the depth stop 310, which retention mechanism 318 retains the depth stop 310 on the drill bit. However, it should be understood that the retention attachment portion 610 could be attached to another portion of the depth stop (e.g., the body or the cap), or directly to the drill bit. The attachment portion 610 has a generally cylindrical sidewall 612, and a radially inwardly projecting rear flange 614 that sits behind the retention mechanism 318. The attachment portion 610 includes a plurality of stiffening ribs 615 to lend structural support and inhibit collapse of the attachment portion 610.

The dust collector 600 further includes an intermediate non-collapsible portion 620 configured to collect dust. The intermediate non-collapsible portion 620 is attached to a front end of the rear attachment portion 610. The intermediate non-collapsible portion 620 includes a generally conical side wall 624, and defines a pocket 629 configured to collect the dust. The plurality of reinforcing ribs 615 extend into the non-collapsible portion 620 to inhibit collapse of the portion 620.

The dust collector 600 also includes a front collapsible section 630 attached to the front end of the non-collapsible portion 620. The collapsible section 630 includes a plurality of generally cylindrical walls 632 that increase in diameter from a rear end of the collapsible portion 630 to a front end of the collapsible portion 630. Each of the generally cylindrical walls 634 is joined to the adjacent generally cylindrical wall 632 (or to an adjacent portion of the dust collector) by a radially outwardly flared wall 634. The cylindrical walls 632 and the flared walls 634 together form a telescoping-style joint. As shown in FIG. 11, the collapsible section 630 is configured to collapse, and turn inside-out, as the drill bit is inserted into the workpiece and the depth stop cap engages the workpiece.

The dust collector 600 additionally includes a front non-collapsible portion 640 attached to the front end of the front collapsible portion 630 and configured to engage the workpiece. The front non-collapsible section 640 includes a plurality of generally cylindrical walls 642 that increase in diameter from a rear end of the non-collapsible portion 640 to a front end of the non-collapsible portion 640. Each of the generally cylindrical walls 642 is joined to the adjacent generally cylindrical wall 642 (or to an adjacent portion of the dust collector) by a radially outwardly flared wall 644. The front end of the non-collapsible portion 640 includes a flange 646 that flares outward and forms a seal between to workpiece and the dust collector 600 to inhibit dust from escaping from the dust collector 600. As shown in FIG. 11, the front non-collapsible section 640 does not collapse as the drill bit is inserted into the workpiece, and creates an auxiliary or supplemental dust pocket 648 for the collection of dust.

As shown in FIGS. 10 and 11, in use, as the drill bit is inserted into the workpiece, and the depth stop approaches and ultimately abuts the workpiece, the collapsible section 630 collapses and turns inside out. At the same time, the ribs 615 and/or geometry of the rear non-collapsible portion 620 and the geometry of the front non-collapsible portion 640 inhibit collapse of the rear and front non-collapsible portions 620, 640, thus preserving the dust pockets 629, 648 as the drill bit is inserted into the workpiece.

The dust collector 600 is made of a unitary piece of elastomeric material, such as rubber or soft plastic. However, it should be understood that some or all of the dust collector 600 can be made of a more rigid material, such as a hard plastic or metal.

Figure 12:
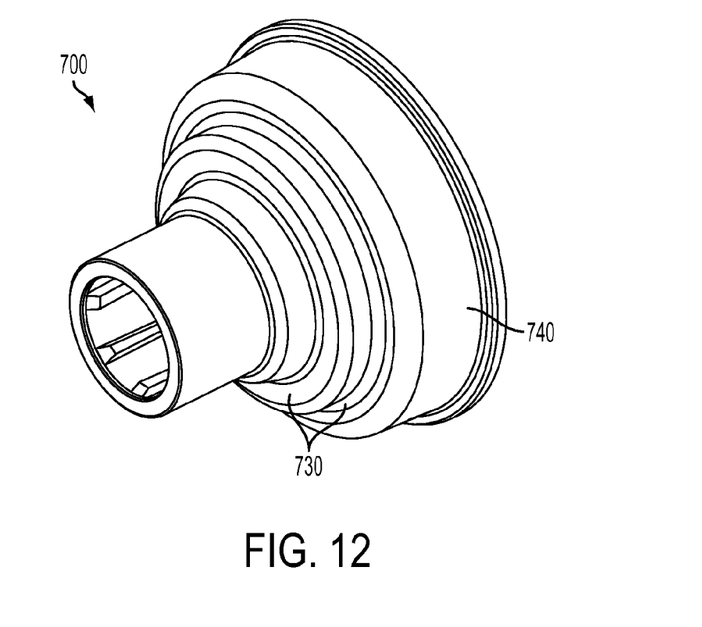
FIG. 12 is a perspective view of a seventh embodiment of a dust collector.
Figure 13:
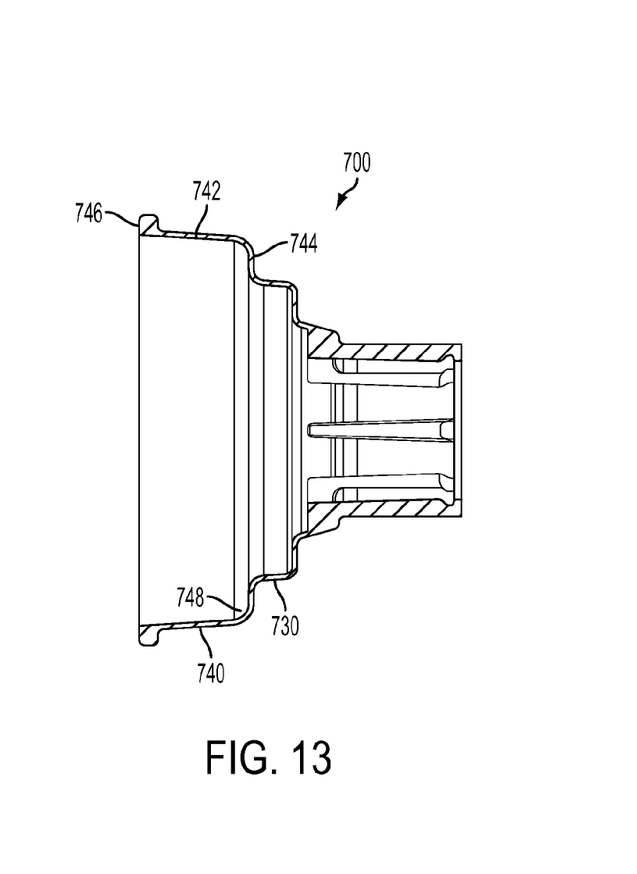
FIG. 13 is a cross-sectional view of the dust collector of FIG. 12.

FIGS. 12 and 13 show a dust collector 700 that is a slightly modified design of the dust collector 600 described above. The dust collector 700 differs from dust collector 600 only in that it has a front non-collapsible portion 740 that includes a single generally cylindrical wall 742 that is joined to the intermediate collapsible portion 730 by a radially outwardly flared wall 744. The front end of the non-collapsible portion 740 includes a flange 746 that flares outward and forms a seal between the workpiece and the dust collector 700 to inhibit dust from escaping from the dust collector 700. The front non-collapsible section 740 does not collapse as the drill bit is inserted into the workpiece, and creates an auxiliary or supplemental dust pocket 748 for the collection of dust. The collapsible portion 730 collapses and turns inside out in the same manner as the collapsible portion 630 of the dust collector 600.

Numerous modifications may be made to the exemplary embodiments described above. These and other embodiments are within the scope of the following claims.

What is claimed is:

1. A dust collector for use with a drill bit or a depth stop that is coupled to a drill bit, the dust collector comprising:
   a rear attachment portion configured to be axially fixed to a drill bit or to a drill bit depth stop that is axially fixed to a drill bit;
   an intermediate non-collapsible portion attached to a front end of the rear attachment portion, the intermediate non-collapsible portion defining a dust-collecting pocket and structured to inhibit collapse as the drill bit is inserted into a workpiece;
   a front collapsible portion including a radially outwardly flared wall attached to a front end of the intermediate non-collapsible portion; and
   a front non-collapsible portion including a generally cylindrical wall extending forward from the front collapsible portion, the generally cylindrical wall having a larger diameter than the intermediate non-collapsible portion and being composed of a rigid material, wherein the front collapsible portion at least partially collapses over the intermediate non-collapsible portion causing the front non-collapsible portion to telescope over the intermediate non-collapsible portion as the drill bit is inserted into a workpiece, wherein the intermediate non-collapsible portion and the front collapsible portion are each composed of an elastomeric material.

2. The dust collector of claim 1, wherein the rear attachment portion includes a cylindrical wall and a radially inward flange configured to be coupled to the drill bit or to the depth stop.

3. The dust collector of claim 1, wherein the intermediate non-collapsible portion defines at least one stiffening rib to inhibit collapse of the non-collapsible portion.

4. The dust collector of claim 1, wherein the front non-collapsible portion defines an auxiliary dust-collecting pocket.

5. The dust collector of claim 1, wherein the front collapsible portion includes a plurality of walls wherein each wall is joined to an adjacent wall by a joint that enables collapse of the walls.

6. The dust collector of claim 5, wherein the joint comprises a telescoping joint.

7. The dust collector of claim 5, wherein the plurality of walls include a plurality of generally cylindrical walls of increasing diameter from a rear end of the collapsible portion to a front end of the collapsible portion.

8. The dust collector of claim 7, wherein each generally cylindrical wall is joined to an adjacent generally cylindrical wall by a radially outwardly flared wall to form a telescoping joint.

9. The dust collector of claim 5, wherein the collapsible portion is configured to turn at least partially inside out when the collapsible portion collapses.

10. A dust collector for use with a drill bit or a drill bit depth stop, the dust collector comprising:

a rear attachment portion that includes a cylindrical wall and a radially inward flange configured to be axially fixed to a drill bit or to a depth stop configured to be axially fixed to a drill bit;

an intermediate non-collapsible portion attached to a front end of the rear attachment portion, the intermediate non-collapsible portion defining a dust-collecting pocket, and having at least one stiffening rib inhibiting collapse of the intermediate non-collapsible portion as the drill bit is inserted into a workpiece;

a front collapsible portion attached to a front end of the intermediate non-collapsible portion and that at least partially collapses as the drill bit is inserted into a workpiece, the front collapsible portion including a telescoping joint defined by a plurality of generally cylindrical walls of increasing diameter from a rear end of the front collapsible portion to a front end of the front collapsible portion, with each generally cylindrical wall being joined to an adjacent generally cylindrical wall by a radially outwardly flared wall; and a front non-collapsible portion having a generally cylindrical wall extending forward from the front collapsible portion, the generally cylindrical wall of the front non-collapsible portion having a larger diameter than the intermediate non-collapsible portion and being composed of a rigid material, wherein the front collapsible portion collapses over the intermediate non-collapsible potion causing the generally cylindrical walls of the front non-collapsible portion to telescope over the intermediate non-collapsible portion as the drill bit is inserted into a workpiece.

11. The dust collector of claim 10, wherein the front non-collapsible portion defines an auxiliary dust-collecting pocket.

12. The dust collector of claim 11, wherein the generally cylindrical wall of the front non-collapsible portion has a greater diameter than the generally cylindrical wall of greatest diameter in the front collapsible portion.

13. The dust collector of claim 10, wherein the intermediate non-collapsible portion and the front collapsible portion are composed of a unitary piece of elastomeric material.

* * * * *